Figure 1:
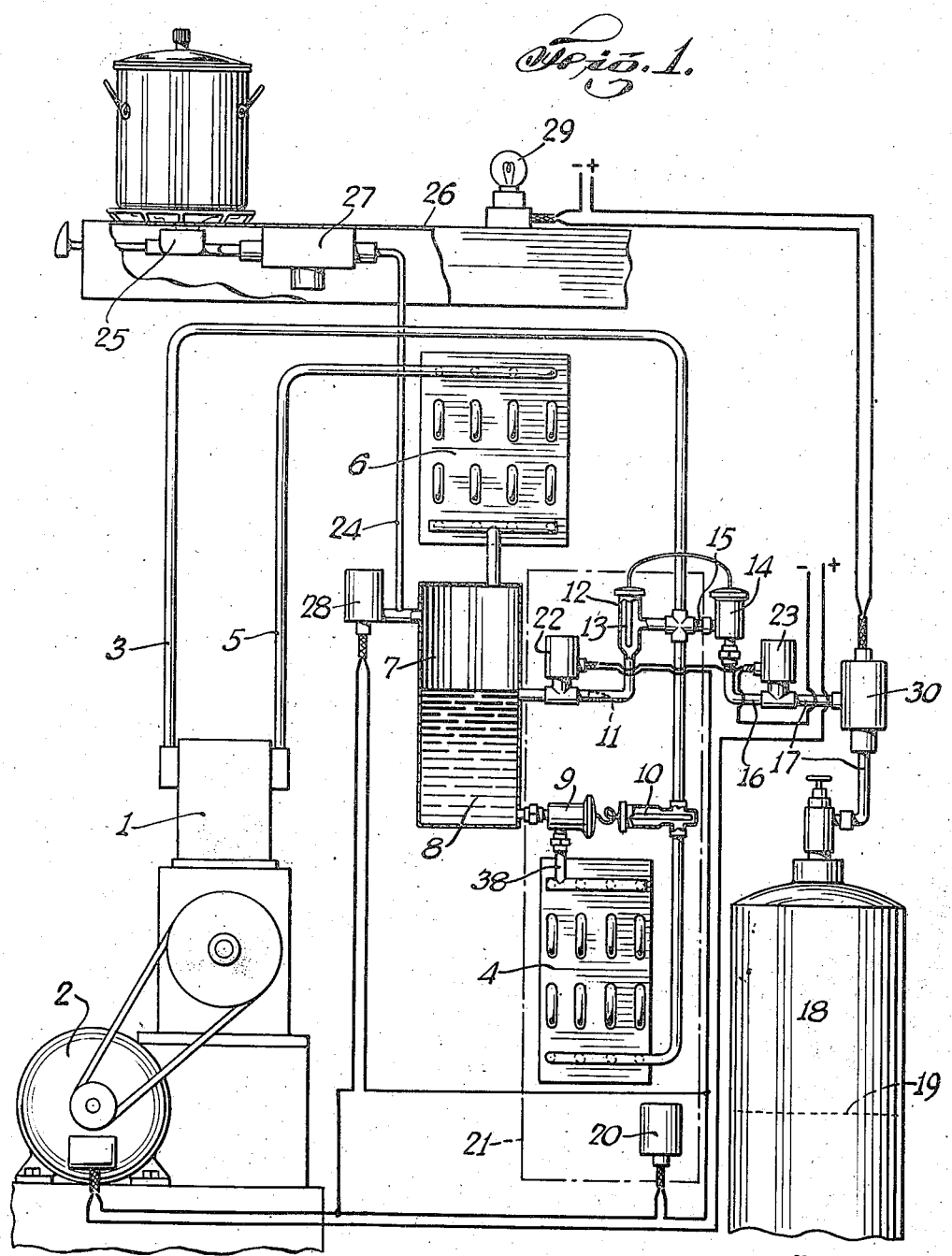

March 19, 1946.                P. SCHLUMBOHM                2,396,887
              REFRIGERATING AND HEATING INSTALLATION
                     Filed Oct. 20, 1939          2 Sheets-Sheet 2

INVENTOR.

Patented Mar. 19, 1946

2,396,887

UNITED STATES PATENT OFFICE 2,396,887

REFRIGERATING AND HEATING INSTALLATION

Peter Schlumbohm, New York, N. Y., assignor to Propane Development Corporation, New York, N. Y., a corporation of Delaware Application October 20, 1939, Serial No. 300,345

4 Claims. (Cl. 62—115)

This invention relates to refrigeration and more particularly is a further development of my invention of the transitory refrigeration compression cycle which is described in my copending patent application Serial No. 264,506, which issued as Patent No. 2,195,388 on March 26, 1940. The instant application is a continuation-in-part.

I found that the transitory cycle is not limited to the original purpose, for which it was invented and which was defined in said copending application as interposing the transitory cycle between a fuel tank, filled with liquified fuel gas, and a motor consuming said fuel. I discovered that the transitory cycle is the key to many problems in connection with "bottled gas" installations, and the present application deals especially with such installations, where hydrocarbons like propane, butane or the like are utilized to give a flame in a gas burner. Burning the gas for heating or cooking purposes has opened a wide market for such liquified petroleum gases, which result either from cracking oil processes or from oil hydrogenation processes. The most popular form of supply is a steel bottle filled with liquified gas, which is detachable from and connected to the burner installation. Such a bottle installation requires mostly two bottles, one being a reserve supply after the other one has been emptied.

The feeding of a burner with gas will be greatly improved, if following this invention a transitory refrigerating compression cycle is interposed between the gas supply and the burner. In this case, the gas supply, e. g. the steel bottle, is connected to the low side of the refrigerating compression cycle, and the gas consumed by the burner is withdrawn from the high-side, from the condenser.

Not only will there be every desired pressure available for operating the burner, but there will also be the advantage of a pre-heated gas being fed to the burner; preheated by the compression and condensation in the cycle. Especially in winter time this will be advantageous, when the steel bottle is exposed to outside air temperatures.

Two modifications of the invention can be offered: If the preheating of the gas is very essential, the transitory compression cycle may be run as a heat pump, by heating the evaporator, e. g. by the ambient air. Part of the condenser heat may also be used for heating the steel supply bottle. This modification, however, seems to be the exception.

The other modification will be to run the compression cycle as a true refrigerating cycle, in which the evaporator is insulated against the ambient air and works at temperatures below 32° F. in the evaporator.

Applying the invention, makes it possible to run the installation with one single steel supply bottle only. Normally, the trouble is, that there is very short notice given of the fact that the bottle is empty. One must bear in mind, that a decrease of the bottle pressure will only take place after the last drop of liquid has evaporated. This, however, does not leave much gas in the bottle, and it was necessary to provide the second bottle in reserve. Following the invention, the receiver tank of the compression cycle would hold such a reserve supply, sufficient to run the burner until a new bottle has replaced the empty one. In this case, it makes sense to let the decrease in the bottle pressure govern a signal, indicating the necessity of replacing the bottle.

In order to secure a sufficient reserve quantity of liquified gas in the receiver, I choose to run the transitory cycle in this case preferably as a slow cycle, referring to the terminology as suggested in my copending application Ser. No. 264,506.

Interposing a transitory refrigerating compression cycle between the steel bottle and the burner, leads constructionally to many interesting combinations of e. g. a kitchen gas range and a refrigerator.

However, certain problems are created by the possible lack of coordination between refrigeration and fuel requirements, contrary to the case of my application Ser. No. 264,506, in which the compression work of the compressor was completely synchronized with the fuel consumption of the motor which drives the compressor.

The main problem in the present case is to secure a sufficient gas pressure on the high-side of the compression cycle independent of the refrigeration requirements of the refrigerator. Following the invention, the operation of the compression cycle is governed by a pressure switch, which is operated by the gas pressure of the condenser and which supersedes any thermostatically caused cut-outs of the electrical motor.

Another solution is to provide a by-pass, a direct connection between the bottle and the burner, and to control this by-pass by a pressure valve, which keeps the by-pass closed as long as a minimum pressure exists in the condenser, while opening the by-pass if said minimum pressure is no longer maintained.

Figure 2:
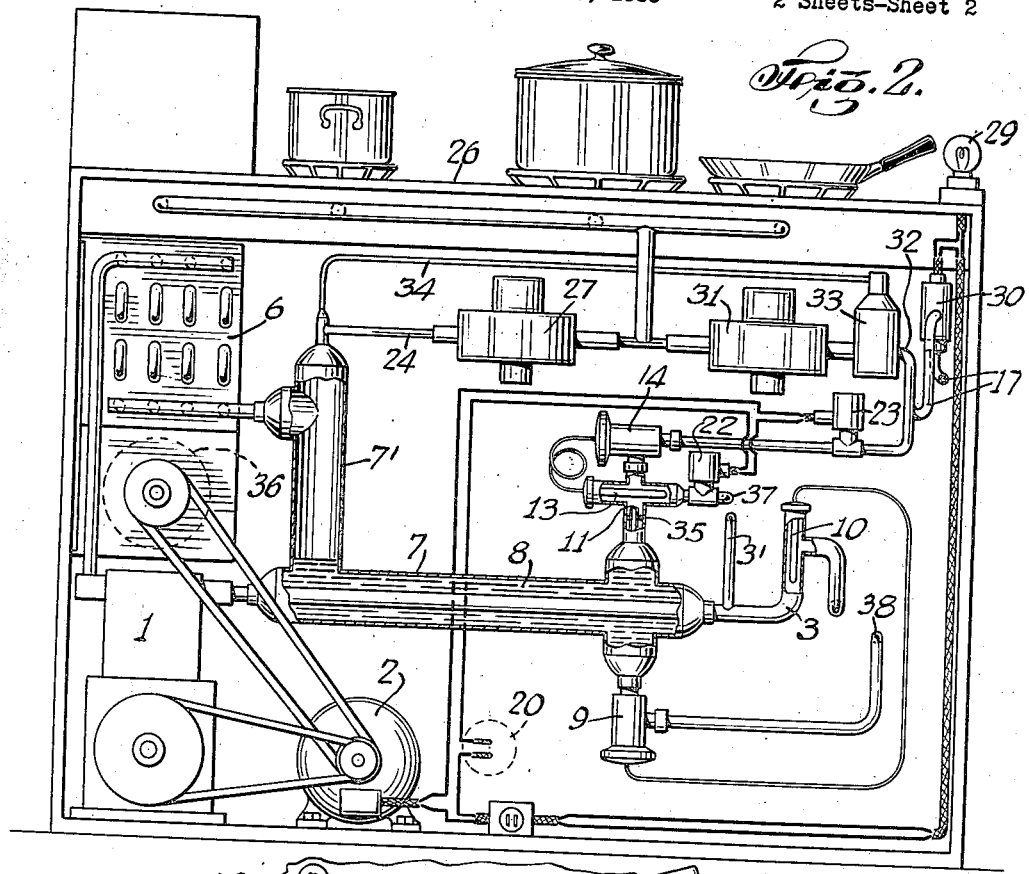
Figure 3:
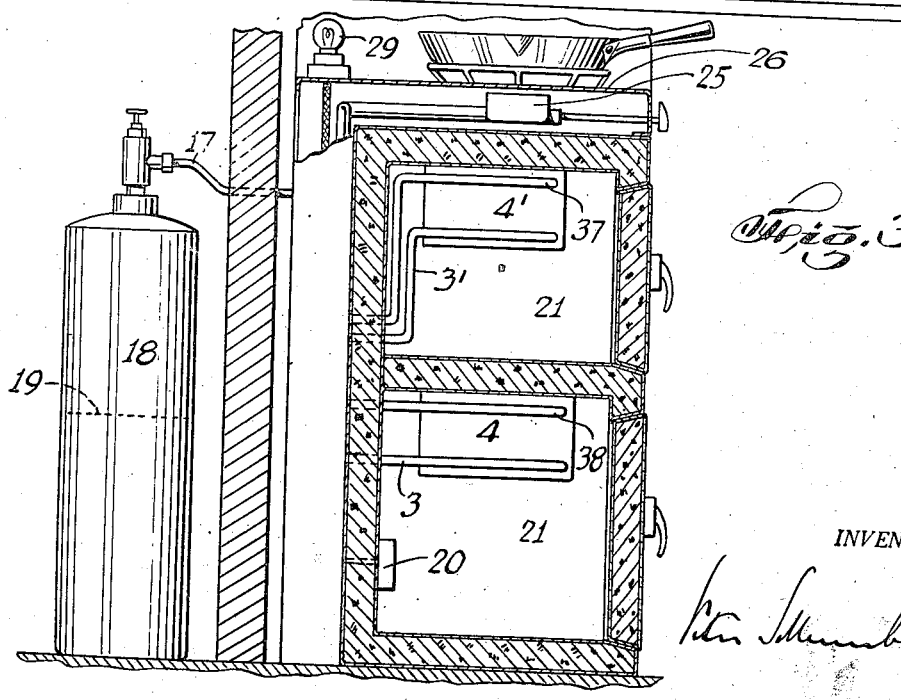

The invention is illustrated in Fig. 1–Fig. 3 of the accompanying drawings. Fig. 1 shows the set-up rather diagrammatically. Fig. 2 is a back view of a combined refrigerator and kitchen gas range, and the arrangement shown may be well taken as a constructional solution of the invention. Fig. 3 is a side-view of Fig. 2, partly in section, and serves to illustrate the relation of the gas bottle to the pipe system of Fig. 2, and it also gives an example of arranging the cooling space of the refrigerator below the gas range.

In Fig. 1 a compressor 1 is driven by an electrical motor 2. The suction line 3 of the compressor is connected to the evaporator 4 and the pressure line 5 connects the compressor with the condenser 6. A receiver tank 7 receives the condensed refrigerant 8 from the condenser. The liquid refrigerant 8 returns through the main expansion valve 9 into the main evaporator 4. The thermal bulb 10 responds to the superheat of the refrigerant and controls the expansion valve 9. As described in my co-pending application Serial No. 264,506, the level of the liquid refrigerant 8 in the receiver tank 7 is controlled by withdrawing refrigerant from the receiver at the desired level to be maintained and to expand the withdrawn refrigerant through a nozzle 11 into a subsidiary evaporator 12 which also is connected to the suction line 3. In the evaporator 12 the thermal bulb 13 of a thermal valve 14 is cooled as long as liquid refrigerant for the nozzle 11 is available at said level in the receiver tank 7. In this case the thermal valve 14 which is connected with its outlet 15 to the suction line 3 and with its inlet 16 to a fill-up line 17, will be closed. The fill-up line 17 connects a steel bottle 18, filled with liquified gas 19, with the suction line 3. If the level of the liquid refrigerant 8 in the receiver tank 7 sinks below the level to be maintained, valve 14 will open and the compressor 1 will pump gas from the storage tank 18, compress and condense it in the condenser 6 until the level in the receiver tank is again high enough to feed the nozzle 11 with liquid. Then the valve 14 will close and the compressor will pump again from the evaporator 4 only. A thermostat 20 may cut-in and cut-out the electrical motor 2, following the refrigeration requirements in the cooling space 21, which is diagrammatically indicated by the dotted line.

If the electric current for the motor 2 is interrupted this will simultaneously interrupt the electric current for the solenoids 22 and 23, thus closing them. A bleeder-line 24 supplies a burner 25 with gas from the receiver tank 7 and the condensor 6. The burner 25 may be part of a cooking range 26. A pressure reduction valve 27 is inserted in the bleeder-line to reduce the pressure of condenser. The condenser pressure operates a pressure switch 28 which cuts in the electrical motor 2 if the condenser pressure sinks below a chosen minimum. This pressure switch 28 supersedes any cut-out action of the thermostat 20.

As explained above, a signal, e. g., an electric lamp 29, is governed by a pressure switch 30 in lamp-up line 17, cutting in the signal if the bottle pressure sinks below a certain minimum.

In Figure 2, which is a rear view of a refrigerator/stove combination, a constructional form is shown which embodies nearly all the elements as illustrated diagrammatically in Figure 1 and the reference numbers of Figure 1 refer to analogous parts. This is true also for Figure 3. In addition, Figure 2 illustrates a by-pass line 32, establishing a direct connection between the fill-up line 17 and the burner 25. This by-pass line 32 has its own pressure reduction valve 31 and it is furthermore controlled by a pressure-valve 33. This pressure-valve 33 is governed by the gas pressure in the condenser/receiver 7, conveyed to the valve 33 by pipe 34. The idea is to close the by-pass 32 by means of valve 33 as long as a certain minimum pressure is maintained in the condenser. Under normal working conditions the gas passes from the fill-up line 17 through the solenoid 23 and the thermal valve 14 into the low side of the compression cycle and is withdrawn by the bleeder-line 24 from the high side of the cycle.

There are several constructional features which proved to be of great merit in operating the transitory compression cycle. The most important is the construction of the receiver tank and the level controls. As illustrated in Fig. 2, a tubular receiver tank 7 is built as heat exchanger so that liquid refrigerant 8 flowing from the condenser 6 to the main expansion valve 9 is cooled in a counter-current heat exchange with the cold vapors which flow through the suction line 3 to the compressor 1. Part of this suction line 3 leads through the tubular receiver tank 7. The receiver is further characterized by a tubular vertical part 7' which serves as a de-gassing chamber to separate vapor and liquid, and also non-condensable gas from the liquid. For structural stability the capillary nozzle 11 is inserted into a slug 35 in the tubular structure of the receiver. The condenser 6 may be cooled by a blower 36, driven by the motor 2.

With the transitory cycle and its level control it is easy to answer the demand of the public to provide in a refrigerator two compartments with different storage temperatures. Following the invention the main expansion valve 9, controlled by the thermal bulb 10, feeds one evaporator 4 and the nozzle 11 feeds a separate evaporator 4' in a separate compartment. Care must be taken that the separate suction line 3' connecting the evaporator 4' with the compressor 1 is joining the main suction line 3 behind the thermal bulb 10 so as not to influence this bulb by the superheat of vapors coming from evaporator 4'.

When operating two separate evaporators in the transitory cycle it is practical to feed the evaporator in the low temperature compartment from the well controlled main expansion valve 9 and to feed the evaporator in the compartment with the higher room temperature from the nozzle 11 which is not governed by any superheat-governor. This arrangement is a safeguard against a potential lack of heat for evaporating the liquids and for superheating the vapor. There is still an additional safeguard in this respect to protect the compressor 1 against taking in liquid refrigerant from the nozzle 11 and this is the heat exchange arrangement between the suction line 3 and the tubular receiver 7.

In Fig. 3 the two different compartments of the refrigerator are shown diagrammatically. Constructionally the refrigerator may form the base for the cooking range 26.

I wish to emphasize a certain principal difference between the invention as described in application Serial No. 264,506 and the present invention. In the first case the merit of the transitory compression cycle was seen from the point of view of improving the operation of a refrigerating system by such arrangements as the purging action and the small quantity of refrigerant as circulating in the fast cycle. In the present case the merit of the transitory cycle is primarily seen in the improved feeding of a burner with "bottled gas." Both advantages represent themselves in such a combination as described above which calls for an efficient refrigerator as well as for an efficient burner.

When speaking of a burner I do not wish to restrict myself to the example of a cooking range burner, but I wish to include all other kinds of burners operated with liquified petroleum gases, such as a burner in a heating stove, in an illuminating device, in a blow-torch or in other devices.

Having now described the nature of my invention and indicated by way of example the manner in which it is to be performed, I claim:

1. A gas-burner in combination with a compressor/condenser/expander system and a supply-tank for liquified petroleum gas; said compressor/condenser/expander system utilizing said gas as condensing and expanding fluid and being connected to said supply-tank to receive said fluid therefrom; said gas-burner utilizing fluid from said supply-tank as fuel; and said burner having its fuel-pipe connected to said compressor/condenser/expander system to pass said fluid from said system to said burner.

2. A gas-burner appliance in combination with a refrigerator cabinet and a supply-tank for liquified petroleum gas; said refrigerator cabinet being cooled by the expander-side of a compressor/condenser/expander refrigerating system, which utilizes liquefiable petroleum gas as refrigerant; said system being connected to said supply-tank to receive refrigerant therefrom; said gas-burner appliance being adapted to using said petroleum gas as fuel for the gas-burner; said gas-burner having two fuel-pipe connections, a first fuel pipe directly connecting said burner with said supply tank, and a second fuel pipe directly connecting said burner with said refrigerating system to receive refrigerant/fuel therefrom.

3. In thermal apparatus, a portable and replaceable bottle of liquefied gaseous fuel, a compressor, a conduit connecting said bottle with the suction side of said compressor, a condenser and means for connecting the discharge side of said compressor with the intake side of said condenser, a receiving tank connected with the discharge side of said condenser, said receiving tank being large enough to incorporate a liquid space and a vapor space, means for burning gaseous fuel at or above a predetermined low pressure, and means for connecting said receiving tank at a point within its vapor space with said fuel burning means, means for directly connecting said bottle with said fuel burning means, means for controlling said direct connection, said controlling means being responsive to the pressure within the vapor space of said receiving tank and acting to effect flow through said direct connection when the pressure within the vapor space of said receiving tank is below a predetermined minimum and acting to retard the flow through said direct connection when the pressure within said vapor space of said receiving tank is above a predetermined minimum, said apparatus including an evaporator, means for connecting said receiving tank at a point within its liquid space to the intake side of said evaporator, and means for connecting the discharge side of said evaporator with the intake side of said compressor, whereby said evaporator may serve to cool or refrigerate a space which it is desired to be refrigerated.

4. The method of feeding a gas burner with fuel from a limited supply of liquified fuel gas, comprising the steps of vaporizing the liquid from said supply to the state of a gas, passing the gas to a compressing and condensing zone, compressing and condensing the gas in said condenser zone, and feeding the gas burner with fuel from said condenser zone, including the step of by-passing said gas condenser zone and feeding the burner directly from the supply zone when the pressure in the condenser zone drops below the pressure required for condensing said gas.

PETER SCHLUMBOHM.